April 29, 1947.                L. H. BROWN                2,419,533
            BORE SIGHTING DEVICE INCLUDING AN APERTURED DIVERGENT LENS
                            Filed Dec. 17, 1943
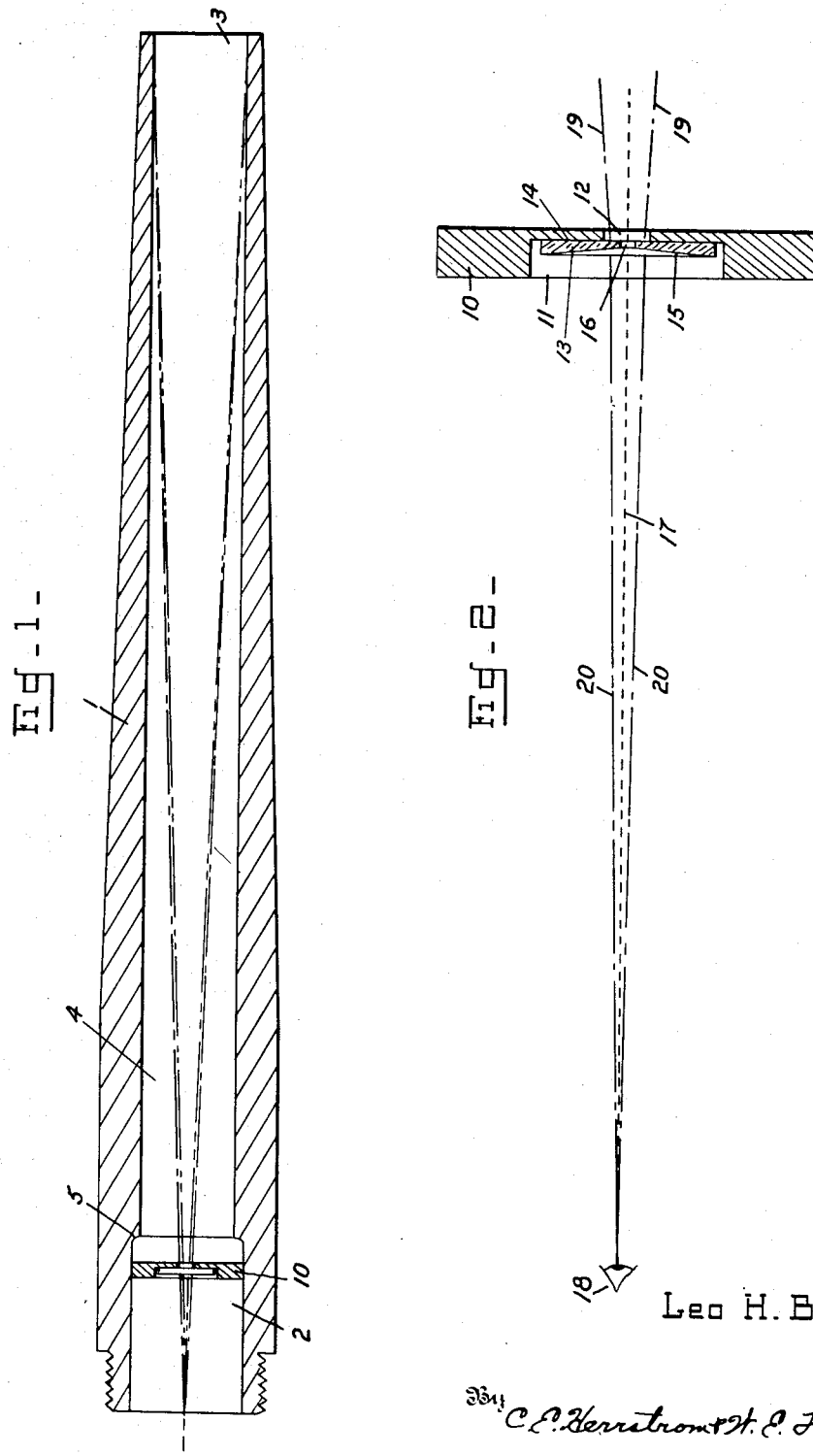
Inventor
Leo H. Brown Patented Apr. 29, 1947

2,419,533

UNITED STATES PATENT OFFICE 2,419,533

BORE SIGHTING DEVICE INCLUDING AN APERTURED DIVERGENT LENS

Leo H. Brown, Glenville, Conn.

Application December 17, 1943, Serial No. 514,614

3 Claims. (Cl. 88—1)

(Granted under the act of March 3, 1883, as amended April 30, 1928; 370 O. G. 757)

The invention described herein may be manufactured and used by or for the Government for governmental purposes without the payment to me of any royalty thereon.

This invention pertains to a novel bore sight for use in connection with guns of large caliber. The operation of bore sighting is employed for the purpose of establishing an accurate relation between the gun barrel and the sighting instrument mounted upon the gun. The operation consists essentially in aligning both the barrel and the instrument with a distant object such as a star. For practical purposes it may be assumed that the distance of the object is infinite and that the two lines of sight are therefore parallel to each other.

In this operation it is necessary, in the interest of accuracy, to center the object in the muzzle of the gun. Without auxiliary aids the centering is, however, only approximate because of the comparatively large image of the muzzle on the retina of the observer. The object of this invention is to reduce the size of this image and thereby enable the observer to center the sighted object more accurately in the muzzle of the gun.

This object is accomplished by means of an image-reducing lens or circular optical wedge inserted in the gun and preferably in the chamber thereof. The lens for accomplishing this function may be one that has a concave conical surface facing the observer and a plane surface facing in the opposite direction or towards the muzzle. In the axis of the lens is an aperture through which the object is sighted directly, but of insufficient size for direct sighting of the muzzle. Light from the latter passes through the lens proper and produces a reduced image of the muzzle on the retina of the observer's eye.

An illustrative embodiment of the invention is disclosed in the following detailed description and in the accompanying drawing in which:

Figure 1 is a longitudinal section of the device, and

Figure 2 is a detail section showing also the lines of sight.

In Figure 1 is shown in cross section a gun barrel 1 formed at one end with the usual chamber 2 and having a muzzle 3 at the other end. Between the chamber 2 and the bore 4 is formed the usual forcing cone 5.

The bore sighting instrument of this invention includes a disk or mounting 10 that is to be fitted accurately in the chamber 2 as shown in Figure 1. The mounting 10 has a central cavity 11 through the bottom of which is formed a comparatively small central opening 12. In the cavity and against the bottom thereof is supported a lens 13 having a plane surface 14 lying perpendicular to the axis of the gun and facing outward, although it will be understood that the lens may be on either side of the mounting. The opposite or inward side of the lens, in the illustrated case, is a concavely conical surface 15 having its axis coincident with the axis of the gun. The purpose of the lens, as will presently be shown, is to reduce the image of the muzzle of the gun when sighted from the chamber 2, and any other suitable image-reducing lens may be employed. For instance, it may be plano-concave, concave-concave or conical-conical. The lens has a through aperture 16 considerably smaller than the opening 12 and centered on the gun axis which is represented by the dotted line 17.

The reference object in the bore sighting operation, usually a star or other distant object, is observed directly through the aperture 16 along the axis of the gun, the observer's eye being designated by the numeral 18 at a point somewhat behind the chamber 2. In order that the line of sight be maintained along the axis 17, the aperture 16 should be of a size on the order of 2 to 5 mm. diameter.

The size of the opening 12 is such as to pass light rays 19 entering the muzzle 3. The aperture 16, however, is of insufficient size to pass all of these rays, whereby a part of them are caused to pass through the body of the optical wedge 13. The nature of the wedge is such as to diverge the rays 19, as illustrated by the refracted rays 20 proceeding from the optical wedge to the eye 18. Consequently the observer sees a reduced virtual image of the muzzle 3, and he can therefore center the distant object with respect to the muzzle with correspondingly greater accuracy.

By means of the apparatus herein described, the bore sighting operation may be performed from within a protective enclosure. The operator is not required to expose himself to enemy fire by going to the muzzle of the gun for mounting the cross wires in the conventional manner. This characteristic of the invention is especially valuable in tank warfare.

While one specific embodiment of the invention has been shown and been described, it will be understood that various alterations may be made without departure from the spirit of the invention as indicated by the appended claims.

What I claim is:

1. In combination with the barrel of a gun, a diverging lens mounted at the rear end thereof and adapted to form a reduced image of the muzzle, said lens having an aperture along its axis, said aperture being centered on the axis of said barrel.

2. In combination with the barrel of a gun, a diverging lens mounted at the rear end thereof and adapted to form a reduced image of the muzzle, said lens having a concavely conical surface on one side and an aperture along its axis, said aperture being centered on the axis of said barrel.

3. In combination with the barrel of a gun, a mounting at the rear end thereof, a diverging lens supported by said mounting and adapted to form a reduced image of the muzzle, said lens having an aperture along its axis, said aperture being centered on the axis of said barrel, said mounting having an opening larger than and concentric with said aperture at the incident side of said lens, whereby a light beam from said muzzle to an observer behind said mounting passes through said opening and is intercepted by said lens.

LEO H. BROWN.

REFERENCES CITED

The following references are of record in the file of this patent:

UNITED STATES PATENTS

| Number | Name | Date |
|---|---|---|
| 2,135,262 | Schumacher | Nov. 1, 1938 |